United States Patent
Oishi et al.

[11] Patent Number: 6,028,894
[45] Date of Patent: Feb. 22, 2000

[54] SIR OR SNR MEASUREMENT APPARATUS

[75] Inventors: Yasuyuki Oishi; Kazuo Nagatani, both of Kawasaki; Hidenobu Fukumasa, Yanai; Hajime Hamada; Yoshihiko Asano, both of Kawasaki, all of Japan

[73] Assignee: Fujitsu Limited, Kanagawa, Japan

[21] Appl. No.: 08/923,839

[22] Filed: Sep. 4, 1997

[30] Foreign Application Priority Data

Dec. 27, 1996 [JP] Japan ..................... 8-349575

[51] Int. Cl.[7] .................. H04B 1/10; H04L 5/00
[52] U.S. Cl. .................. 375/227; 375/284; 375/346; 455/67.3; 455/226.3
[58] Field of Search .................. 375/227, 224, 375/284, 285, 346; 370/252; 455/226.3, 67.3, 67.1; 324/614; 348/193; 702/69

[56] References Cited

U.S. PATENT DOCUMENTS 4,835,790  5/1989  Yoshida et al. .................. 375/227
5,524,026  6/1996  Murata .................. 375/329

Primary Examiner—Young T. Tse
Attorney, Agent, or Firm—Helfgott & Karas, PC.

[57] ABSTRACT

SIR measurement for measuring S/N ratio, which is the ratio of a desired signal power to noise power, or S/I ratio, which is the ratio of desired signal power to interference signal power, uses a signal-point position altering unit for taking absolute values of an I component (in-phase component) and Q component (quadrature component) of a received signal to convert the received signal to a signal in the first quadrant of an I-Q orthogonal coordinate system, and for squaring the average value of the converted signal to obtain first average power (desired power) S, a received-power arithmetic unit for calculating the average value of the square of the received signal to obtain second average power, and for subtracting the desired power S from the received power to obtain noise power or interference power I, and a SIR arithmetic unit for calculating S/N ratio or S/I ratio from the desired signal power S and noise power or interference signal power I, and for outputting the ratio calculated.

4 Claims, 18 Drawing Sheets

SIR OR SNR MEASUREMENT APPARATUS

BACKGROUND OF THE INVENTION

This invention relates to an apparatus for measuring SIR. More particularly, the invention relates to an SIR measurement apparatus for measuring S/N ratio, which is the ratio of a desired signal power to noise power, or S/I (signal interference) ratio, which is the ratio of desired signal power to interference signal power.

In order to control and monitor communication quality in wireless communication, it is required that the signal-to-noise ratio S/N or signal-to-interference ratio S/I of a received signal be measured in the receiver. In a signal which uses CDMA (Code Division Multiple Access) now being considered as the next generation of communications technique, a characterizing feature is that interference power decides the capacity of the system. For this reason, a CDMA system employs a closed-loop transmission power technique through which the S/I ratio is held constant. In order to carry out such transmission power control, measuring S/N ratio or S/I ratio is essential.

FIG. 16 is a diagram useful in describing the necessity of transmission power control. Shown in FIG. 16 are a base station (BS) 1 and mobile stations ($MS_1$~$MS_n$) $2_1$~$2_n$. Communication is carried out by CDMA. CDMA is a multiple access method using spread-spectrum communication, in which the base station 1 spread-spectrum modulates transmission information of a plurality of channels or users by codes (pseudorandom noise, or PN, sequences) that differ from one another, and transmits the spread-spectrum modulated signals upon multiplexing the same. Each of the mobile stations $2_1$~$2_n$ de-spreads the received code-multiplexed signal using its own code (e.g. PN sequence) assigned at the time of communication and demodulates the transmission information addressed to the station. Each mobile station also spread-spectrum modulates transmission information by PN and sends the information to the base station 1. In mobile radio using CDMA, the signals from the mobile stations $2_1$~$2_n$ reach the base station 1 while being superposed in time. The signal strength (power) which reaches the base station 1 from each of the mobile stations $2_1$~$2_n$ differs depending upon disparities in distance, communication environment of transmission links and transmission power. As seen from a first mobile station, the signal output from another mobile station is interference. The first mobile station will be incapable of communicating if the strength of the signal from the other mobile station becomes too large. It is necessary, therefore, to hold constant the S/I ratio, namely the ratio of signal power which reaches the base station 1 from prescribed mobile stations $2_1$~$2_n$, to the power of interference waves, which include thermal noise. This makes it necessary to control transmission power.

FIG. 17 shows the flow of processing for transmission power control using a closed-loop system. The base station BS measures the S/I ratio, namely the ratio of received signal power from a mobile station MSi (i=1, 2, . . . n) to interference signal power (step 111) and notifies the mobile station MSi of the measured S/I ratio using an outgoing signal (step 112). The mobile station MSi determines whether the base station BSi has notified it of the S/I ratio (step 121), decides transmission power based upon the S/I ratio of which it has been notified and transmits its signal at this transmission power (step 122).

FIG. 18 is a block diagram useful in describing the position at which a conventional SIR measurement apparatus 4 is disposed relative to a receiver 3. It should be noted that a transmitter distributes serial data alternately one bit at a time to split the data into two sequences, namely in-phase component data and quadrature component data. The data in each of the two sequences is spread-spectrum modulated by being multiplied by PN, quadrature phase-shift keying (QPSK) modulation is applied to the spread-spectrum modulated signals of the I and Q components and the resulting signal is transmitted. The receiver 3 has an antenna $3a$, a broadband band-pass filter $3b$ which passes only the necessary frequency band, a quadrature demodulator (QDET) $3c$ which demodulates spread-spectrum modulated signals $V_I$, $V_Q$, de-spreading circuits $3d_I$, $3d_Q$ to which the spread-spectrum modulated signals $V_I$, $V_Q$ of the I and Q components are applied as inputs and which output data $D_I$, $D_Q$ of the I and Q components, and a data demodulator $3e$ for applying reverse-rotation processing to the data $D_I$, $D_Q$ in an amount equivalent to the phase rotation produced by transmission, deciding the level of the results of rotation processing and outputting the reproduced data.

The de-spreading circuits $3d_I$, $3d_Q$ respectively include multipliers $5_I$, $5_Q$ for multiplying the spread-spectrum modulated signals $V_I$, $V_Q$ by PN sequences $C_I$, $C_Q$ identical to those on the transmitting side, and integrators $6_I$, $6_Q$ for integrating the multiplier output signals over one symbol interval and successively outputting the results of integration, namely the I- and Q-component data $D_I$, $D_Q$. When the spread-spectrum modulated signals $V_I$, $V_Q$ of the I and Q components are expressed on an I-jQ complex plane, the result is as shown in FIG. 19, in which a resultant vector V is the vector of the spread-spectrum modulated signal on the I-jQ complex plane.

FIG. 20 is a block diagram illustrating the construction of the SIR measurement apparatus 4. Shown at $3d$ is a de-spreading circuit (which corresponds to the de-spreading circuits $3d_I$, $3d_Q$ of FIG. 18). The SIR measurement apparatus 4 includes a power arithmetic unit $4a$ for calculating power P of a spread-spectrum modulated signal, before the signal is de-spread, in accordance with the equation $$P = V_I^2 + V_Q^2$$

averaging arithmetic unit $4b$ for calculating the average value of power covering N symbols, an interference power calculating unit $4c$ for multiplying the average power by 1/PG (where PG represents the spreading ratio) to calculate interference power I, a desired signal power arithmetic unit $4d$ for calculating desired signal power Pd after de-spreading in accordance with the equation $$Pd = D_I^2 + D_Q^2$$

an averaging arithmetic unit $4e$ for calculating the average value S of desired signal power over N symbols, and an SIR arithmetic unit $4f$ for calculating the SIR from the desired signal power S and interference signal power I in accordance with the equation $$SIR = S/I$$

In spread-spectrum communication, the spreading circuit of the transmitter multiplies a digital signal by PN (a rectangular wave of random +1 and -1 levels) to spread-spectrum modulate the signal. The rate of change of the PN sequence (namely duration Tc of the rectangular wave) is set so as to change over at a very high rate in comparison with symbol changeover speed (one bit interval T of the data) to be modulated thereby. That is, T>>Tc holds. The duration of T is referred to as the "bit duration", the duration of Tc is referred to as the "chip duration", and the ratio of T to Tc (i.e. T/Tc) is referred to as the spreading ratio, which is represented by PG. The band (=2/T) of the desired signal is spread by spread-spectrum modulation and becomes 2/Tc. That is, the band is spread by a factor of PG. As a result, the inputs to the receiver are a desired signal Sd, which is the result of spreading the band by a factor of PG by spread-spectrum modulation, and an interference signal Si, as shown in FIG. 21.

The power arithmetic unit 4a calculates the power of the signal that is the resultant of the desired signal Sd and interference signal Si, and the interference power calculating unit 4c multiplies the average power by 1/PG to calculate the interference signal power I (the portion hatched from lower left to upper right in FIG. 21) whose bandwidth is the same as that of the desired signal. Meanwhile, the desired signal power arithmetic unit 4d and averaging arithmetic unit 4e calculate the average value S of the desired signal power after de-spreading, and the SIR arithmetic unit 4f calculates the SIR by the operation S/I and outputs the signal representing SIR.

FIG. 22 is a block diagram illustrating another example of the construction of as SIR measurement apparatus 5 according to the prior art. The receiver 3 has the same construction as the receiver shown in FIG. 18 and identical components are designated by like reference characters.

The SIR measurement apparatus 5 includes a signal-point position altering unit 5a which, as shown in FIG. 23A, converts a received signal point D (whose I and Q components are $D_I$ and $D_Q$, respectively) in the I-jQ plane to a point in the first quadrant of the plane. More specifically, the signal-point position altering unit 5a takes the absolute values of the I component (in-phase component) $D_I$ and Q component (quadrature component) $D_Q$ of the received signal D to convert the received signal to a signal in the first quadrant of the I-jQ complex plane. The SIR apparatus 5 further includes an averaging arithmetic unit 5b for calculating the average value m of N symbols of the received signal, a desired signal power arithmetic unit $5_c$ for calculating $m^2$ (power S of the desired signal) by squaring the I and Q components of the average value m and summing the squares, and an ideal position vector output unit (pilot) 5d for outputting an ideal signal-point position vector of a pilot symbol. The unit 5d senses a pilot symbol that has been inserted in a data frame and outputs I and Q components (vector Dip) conforming to the ideal signal point (already known) of the pilot symbol, as shown in FIG. 23B. The SIR apparatus 5 further includes an error vector arithmetic unit 5e for calculating an error vector $D_{ERR}$ between an actual position vector $D_{AP}$ of a pilot symbol and the ideal point position vector $D_{IP}$, an error power arithmetic unit 5f for calculating variance $\sigma^2$ (power of the error vector) of received power by calculating the square of each axial component of the error vector, an averaging arithmetic unit 5g for calculating the average value of the error power and outputting interference signal power I, and a SIR arithmetic unit 5h for calculating the SIR from the desired signal power S and interference signal power I in accordance with the equation

SIR=S/I

If we let xi (i=1, 2, ... N) represent an input signal which contains a desired signal and interference, then the average value m of the input signals will be expressed by the following equation:

$m=(1/N)\cdot\Sigma xi$ $(i=1, 2, ... N)$ and the result of squaring the average value m is the desired signal power. On the other hand, the average value $\sigma^2$, which is the result of squaring the difference between the input signal and the average value, is the interference signal power. This is expressed as follows:

$\sigma^2=(1/N)\cdot\Sigma(xi-m)^2 (i=1, 2, ... N)$

The signal-point position altering unit 5a, averaging arithmetic unit 5b and desired signal power arithmetic unit 5c squares the average value m of the input signals to obtain the desired signal power S. On the other hand, the ideal position vector output unit 5d, error vector arithmetic unit 5e, error power arithmetic unit 5f and averaging arithmetic unit 5g obtain the interference signal power I. The operation S/I is performed by the SIR arithmetic unit 5h, which outputs the SIR.

With the SIR measurement method shown in FIG. 20, the average power of the signal which is the resultant of the desired signal Sd and interference signal Si is multiplied by 1/PG to calculate the interference power I (the portion hatched from lower left to upper right in FIG. 21). Consequently, the calculated interference signal power I includes the desired signal power (see the double-hatched portion in FIG. 21). This is a cause of measurement error. If the number of multiplex channels or number of users in CDMA is small, the proportion of the desired signal power contained in the interference signal power I increases and so does the SIR measurement error.

With the SIR measurement method shown in FIG. 22, it is required that the vector error between the received signal and the ideal signal be determined. As a result, it is required to execute pilot detection, calculation of vector error and squaring of the vector error on a per-symbol basis, and to perform averaging. A problem that arises is a complicated circuit arrangement and complicated arithmetic operations.

SUMMARY OF THE INVENTION

Accordingly, an object of the present invention is to provide as SIR measurement apparatus in which SIR can be measured highly accurately and through a simple arrangement and simple operations.

In accordance with the present invention, the foregoing object is attained by providing an SIR measurement apparatus comprising means for taking absolute values of an I component (in-phase component) and Q component (quadrature component) of a received signal to convert the received signal to a signal in the first quadrant of an I-Q orthogonal coordinate system, and squaring the average value of the converted signal to obtain first average power, means for calculating the average value of the square of the received signal to obtain second average power, means for subtracting the first average power from the second average power to obtain noise power or interference signal power, and means for adopting the first average power as desired signal power, calculating S/N ratio or S/I ratio from the desired signal power and noise power or interference signal power, and outputting the ratio calculated.

Further, according to the present invention, the foregoing object is attained by providing an SIR measurement apparatus comprising means for determining a quadrant of an I-Q orthogonal coordinate system in which a received signal comprising an I component (in-phase component) and Q component (quadrature component) belongs, means for converting the received signal to a signal in the first quadrant of the I-Q orthogonal coordinate system by subjecting the received signal to phase rotation through an angle conforming to the quadrant in which the received signal belongs, and squaring the average value of the converted signal to obtain first average power, means for calculating the average value of the square of the received signal to obtain second average power, means for subtracting the first average power from the second average power to obtain noise power or interference signal power, and means for adopting the first average power as desired signal power, calculating S/N ratio or S/I ratio from the desired signal power and noise power or interference signal power, and outputting the ratio calculated.

In accordance with the SIR measurement apparatus described above, it is unnecessary to execute pilot detection, calculation of vector error and squaring of the vector error on a per-symbol basis and averaging is not required. This makes it possible to simplify the circuit arrangement and to simplify the arithmetic operations.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) Construction of Transmitter/Receiver FIG. 1 is a block diagram illustrating a transmitter/receiver having an SIR measurement apparatus according to the present invention. Shown in FIG. 1 are a receiver 11, a transmitter 12 and a SIR measurement apparatus 13. It should be noted that the transmitter distributes serial data alternately one bit at a time to split the data into two sequences, namely in-phase component (I-component) data and quadrature component (Q-component) data. The data in each of the two sequences is spread-spectrum modulated by being multiplied by PN, quadrature phase-shift keying (QPSK) modulation is applied to the spread-spectrum modulated signals of the I and Q components and the resulting signal is transmitted.

Figure 1:
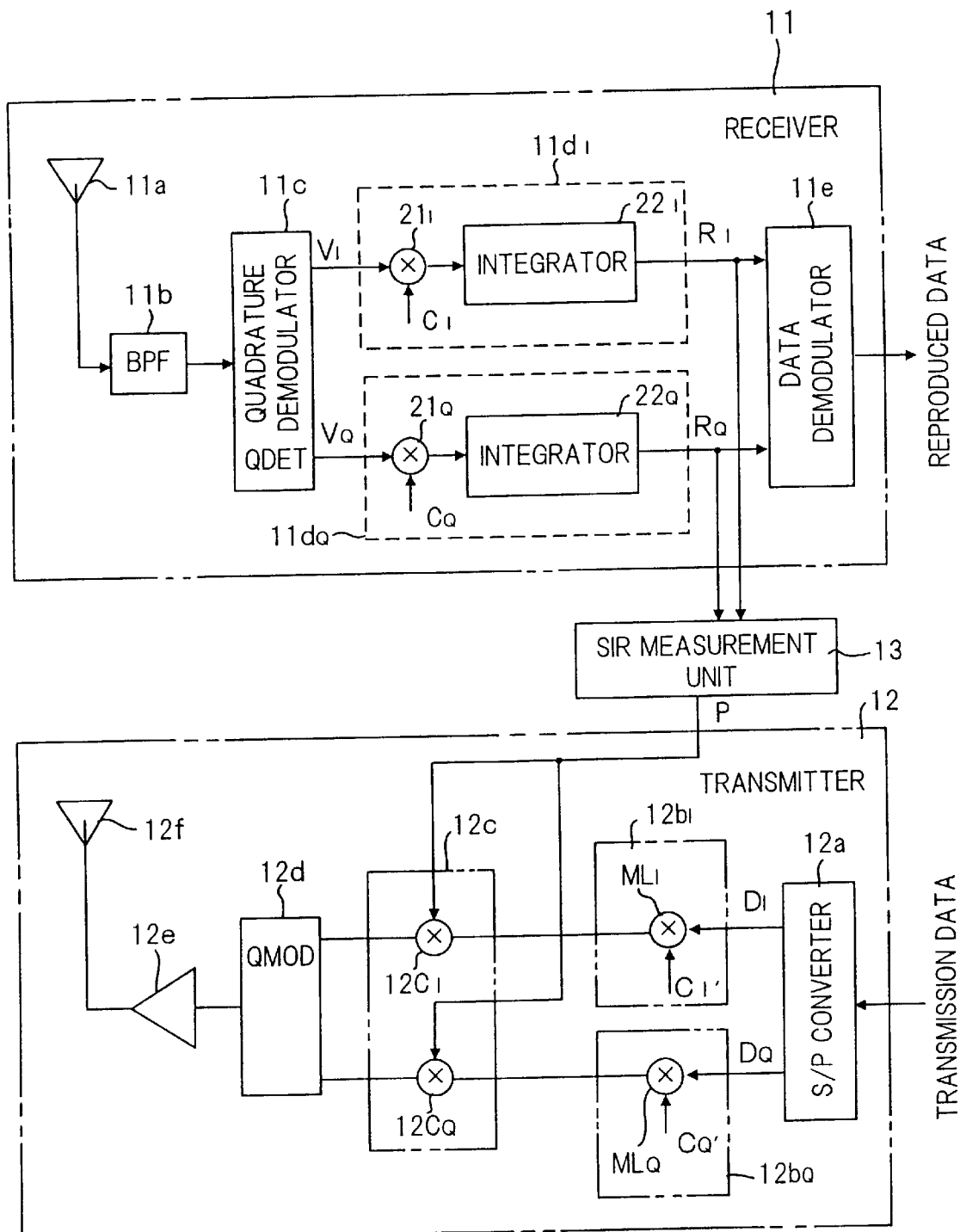
FIG. 1 is a block diagram illustrating a transmitter/receiver having an SIR measurement apparatus according to the present invention.
Figure 2:
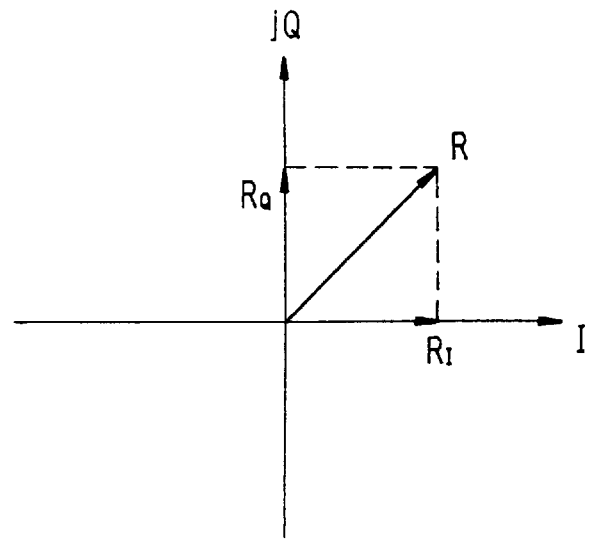
FIG. 2 is a vector diagram useful in describing a signal-point position vector of received data.

The receiver 11 has an antenna 11a, a wide-band band-pass filter 11b which passes only the necessary frequency band, a quadrature demodulator (QDET) 11c which demodulates spread-spectrum modulated signals $V_I$, $V_Q$, de-spreading circuits $11d_I$, $11d_Q$ to which the spread-spectrum modulated signals $V_I$, $V_Q$ of the I and Q components are applied as inputs and which output data $R_I$, $R_Q$ of the I and Q components, and a data demodulator 11e for applying reverse-rotation processing to the data $R_I$, $R_Q$ in an amount equivalent to the phase rotation produced by transmission, deciding the level of the results of rotation processing and outputting the reproduced data. The de-spreading circuits $11d_I$, $11d_Q$ respectively include multipliers $21_I$, $21_Q$ for multiplying the spread-spectrum modulated signals $V_I$, $V_Q$ by PN sequences $C_I$, $C_Q$ identical to those on the transmitting side, and integrators $22_I$, $22_Q$ for integrating the multiplier output signals over one symbol interval and successively outputting the results of integration, namely the I- and Q-component data $R_I$, $R_Q$. When the data $R_I$, $R_Q$ of the I and Q components are expressed on an I-jQ complex plane, the result is as shown in FIG. 2, in which a resultant vector R is the signal-point position vector of the received data on the I-jQ complex plane.

The transmitter 12 includes a serial/parallel converter (S/P converter) 12a which distributes transmission data alternately one bit at a time to convert the data to two sequences, namely the I-component data $D_I$ and Q-component data $D_Q$, and spreading circuits $12b_I$, $12b_Q$ having PN generators (not shown) for generating PN (pseudorandom noise) sequences $C_I'$, $C_Q'$, respectively, and multipliers $ML_I$, $ML_Q$ for multiplying the I-component data $D_I$ and Q-component data $D_Q$ by the PN sequences $C_I'$, $C_Q'$, respectively. The transmitter 12 further includes an attenuator 12c for controlling transmission power. The attenuator 12c has multipliers $12c_I$, $12c_Q$ for multiplying the spread-spectrum modulated signals of the I and Q components by a transmission-power control coefficient p, which conforms to the SIR value of the received signal, thereby controlling transmission power. It should be noted that the attenuator can be provided on the output side of a quadrature modulator (QMOD) 12d. The quadrature modulator (QMOD) 12d subjects the attenuator output to quadrature phase-shift keying (QPSK) modulation. A power amplifier 12e amplifies the output of the quadrature modulator 12d. An antenna is shown at 12f.

Figure 3:
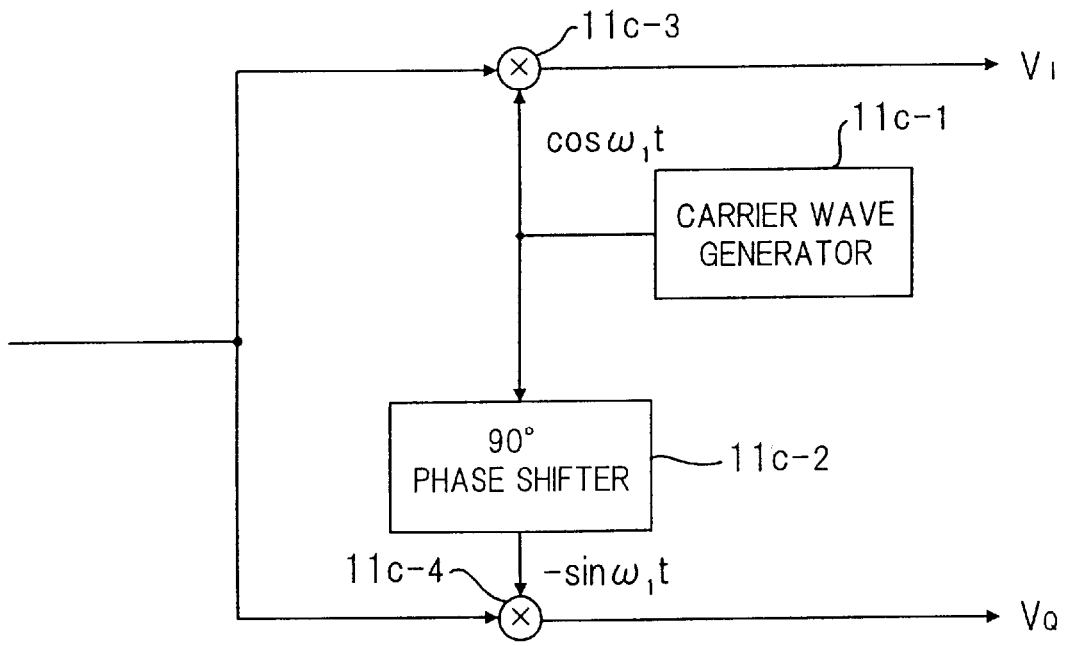
FIG. 3 is a diagram showing the construction of a quadrature demodulator.

FIG. 3 illustrates the construction of the quadrature demodulator 11c. The quadrature demodulator 11c includes a carrier generator 11c-1 for outputting a carrier wave cos $\omega_1 t$ having a prescribed frequency, a 90° phase shifter 11c-2 for shifting the phase of the carrier wave by 90° and outputting —sin $\omega_1 t$, a multiplier 11c-3 for multiplying the input signal by cos $\omega_1 t$ and outputting the I component $V_I$ of the spread-spectrum modulated signal, and a multiplier 11c-4 for multiplying the input signal by —sin $\omega_1 t$ and outputting the Q component $V_Q$ of the spread-spectrum modulated signal.

Figure 4:
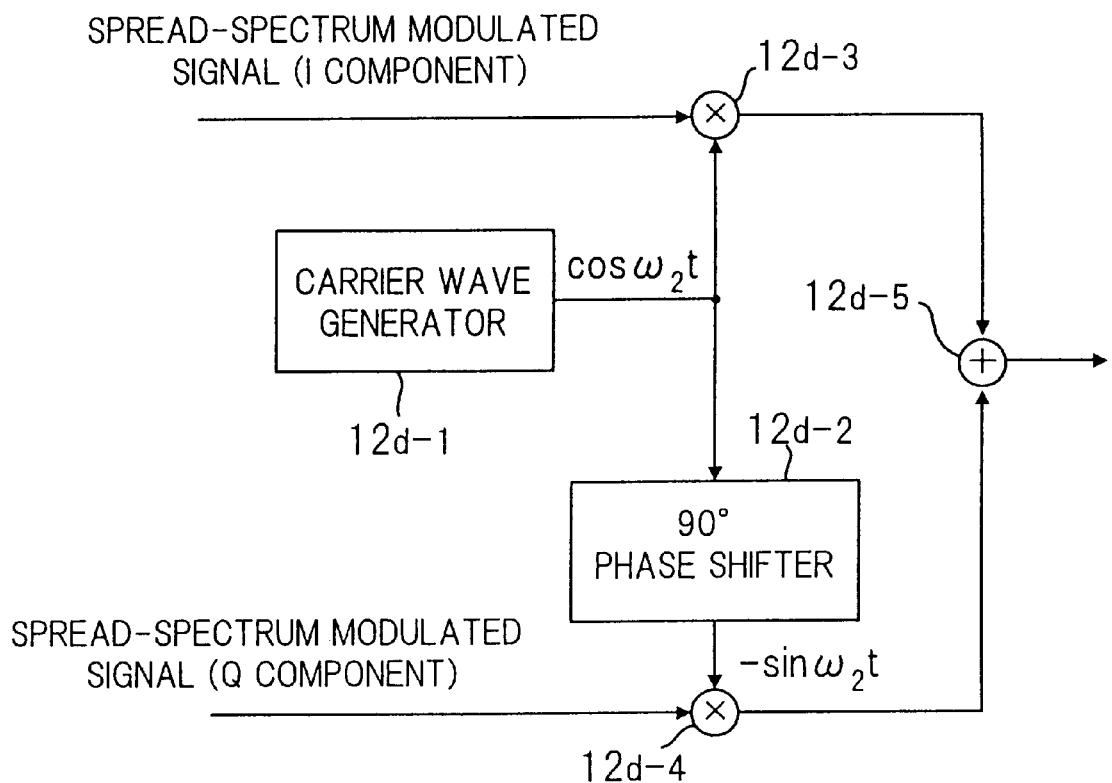
FIG. 4 is a diagram showing the construction of a quadrature modulator.

FIG. 4 is a diagram showing the construction of the quadrature modulator 12d. The quadrature modulator 12d includes a carrier generator 12d-1 for outputting a carrier wave cos $\omega_2 t$ having a prescribed frequency, a 90° phase shifter 12d-2 for shifting the phase of the carrier wave by 90° and outputting —sin $\omega_2 t$, a multiplier 12d-3 for multiplying the input signal (the I component of the spread-spectrum modulated signal) by cos $\omega_2 t$, a multiplier 12d-4 for multiplying the input signal (the Q component of the spread-spectrum modulated signal) by —sin $\omega_2 t$, and a combiner 12d-5 for combining the outputs of each of these multipliers and entering the result into the power amplifier 13e.

Figure 5:
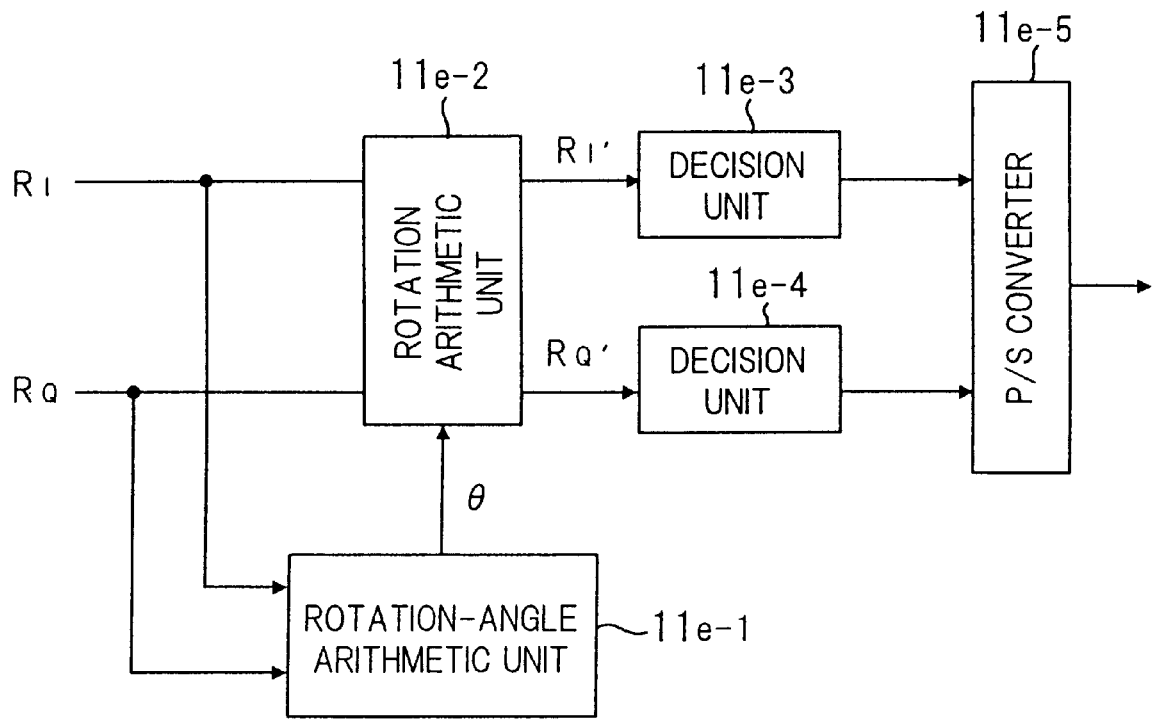
FIG. 5 is a diagram showing the construction of a data demodulator.
Figure 6:
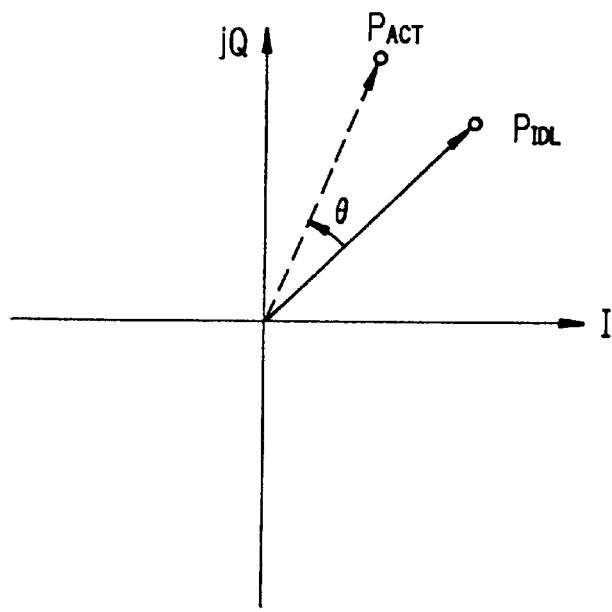
FIG. 6 is a diagram for describing the operation of the data demodulator.

FIG. 5 is a diagram showing the construction of the data demodulator 11e, and FIG. 6 is a diagram for describing the operation of the data demodulator 11e.

As shown in FIG. 5, the data demodulator 11e includes a rotation-angle arithmetic unit 11e-1 for sensing a pilot symbol that has been inserted into a data frame and calculating an angle θ of rotation from an ideal pilot symbol position to the actual pilot symbol position, a rotation arithmetic unit 11e-2 for applying a -θ rotating operation to a signal-point position vector whose I and Q components are the data $R_I$, $R_Q$ output by the de-spreading circuits $11d_I$, $11d_Q$, respectively, decision circuits 11e-3, 11e-4 for comparing $R_I'$, $R_Q'$, which have been obtained by application of the rotation processing, with a set level to decide "1", "0", and a P/S converter 11e-5 for converting I-, Q-component data to serial data.

If a pilot symbol that has been inserted into a data frame is sensed and its signal-point position vector $P_{ACT}$ (see FIG. 6) is known, then the phase rotation angle θ of the symbol ascribed to transmission can be determined because the ideal signal-point position vector $P_{IDL}$ of the pilot symbol is already known. Accordingly, the rotation-angle arithmetic unit 11e-1 senses the pilot symbol and calculates its phase rotation angle θ, the rotation arithmetic unit 11e-2 subjects each symbol to rotation processing to rotate it through a rotation angle of -θ, thereby returning the symbol to the original, and the decision circuits 11e-3, 11e-4 decide "1", "0" of the data $R_I'$, $R_Q'$ obtained by application of the rotation processing. As a result, highly precise data demodulation is possible.

(B) First Embodiment of SIR Measurement Apparatus

Figure 7:
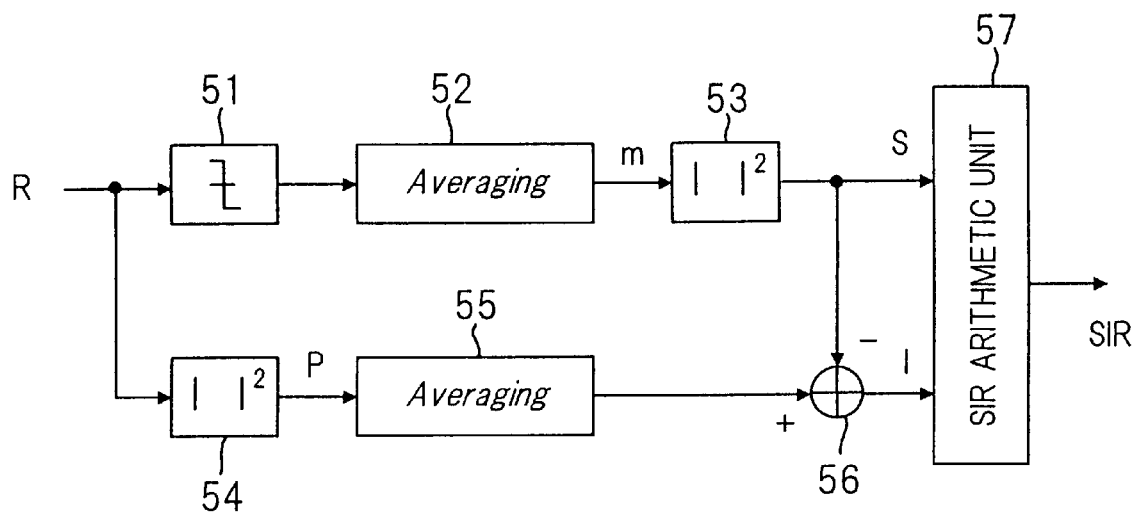
FIG. 7 is a block diagram showing the construction of an SIR measurement apparatus according to a first embodiment of the present invention.

FIG. 7 is a block diagram illustrating a first embodiment of a SIR measurement apparatus according to the present invention.

Figure 8:
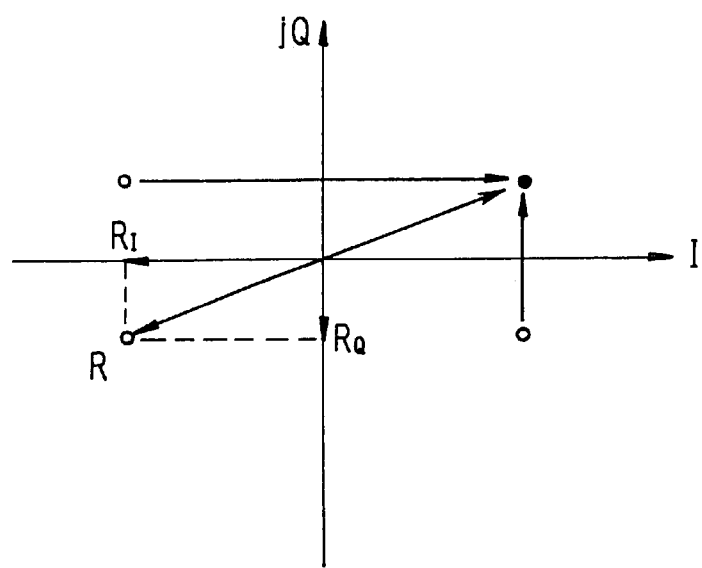
FIG. 8 is a diagram for describing a method of changing the quadrant of a position vector.

As shown in FIG. 7, the SIR measurement apparatus includes a signal-point position altering unit 51 which, as shown in FIG. 8, converts the position vector R (whose I and Q components are $R_I$ and $R_Q$, respectively) of a received signal point in the I-jQ plane to a position vector in the first quadrant of the plane. More specifically, the signal-point position altering unit 51 takes the absolute values of the I component (in-phase component) $R_I$ and Q component (quadrature component) $R_Q$ of the position vector R of the received signal point to convert the position vector to a signal in the first quadrant of the I-jQ complex plane. The SIR apparatus further includes an averaging arithmetic unit 52 for calculating the average value m of received signal-point position vectors of N symbols, a desired signal power arithmetic unit 53 for calculating $m^2$ (power S of the desired signal) by squaring the I and Q components of the average value m and summing the squares, a received power calculating unit 54 for calculating received power P by performing the operation given by the following equation:

$$P = R_I^2 + R_Q^2$$

an averaging arithmetic unit 55 for calculating the average value of received power, a subtractor 56 for subtracting $m^2$ (desired signal power) from the average value of received power and outputting interference signal power I, and a SIR arithmetic unit 57 for calculating the SIR from the desired signal power S and interference signal power I in accordance with the equation $$SIR = S/I \qquad (1)$$

If we let xi (i=1, 2, ... N) represent an input signal which contains a desired signal and interference, then the average value m of the input signals will be expressed by the following equation:

$$m = (1/N) \cdot \Sigma xi \ (i=1, 2, \ldots N) \qquad (2)$$

and the result of squaring the average value m is the desired signal power S. On the other hand, the average value (variance) $\sigma^2$, which is the result of squaring the difference between the input signal and the average value, is the interference signal power I. This is expressed as follows:

$$\sigma^2 = (1/N) \cdot \Sigma (xi-m)^2 (i=1, 2, \ldots N) \qquad (3)$$

Transforming Equation (3) gives us the following:

$$\sigma^2 = (1/N) \cdot \Sigma xi^2 - (2m/N) \cdot \Sigma xi + (1/N) \cdot \Sigma m^2$$

$$= (1/N) \cdot \Sigma xi^2 - 2m^2 + m^2 = [(1/N) \cdot \Sigma xi^2] - m^2 \qquad (4)$$

The signal-point position altering unit 54 and averaging arithmetic unit 55 execute the operation indicated by the first term on the right side of Equation (4), the subtractor 56 calculates the interference power I by subtracting $m^2$ (desired signal power S) from the output of the averaging arithmetic unit 55, and the SIR arithmetic unit 57 executes the operation of Equation (1) and outputs SIR.

In accordance with the first embodiment, N symbols undergo a subtraction operation only once and it is too unnecessary to execute pilot detection, calculation of vector error and squaring of the vector error on a persymbol basis and averaging is not required. This makes it possible to simplify the circuit arrangement and to simplify the arithmetic operations.

(C) Second Embodiment of SIR Measurement Apparatus

Figure 9:
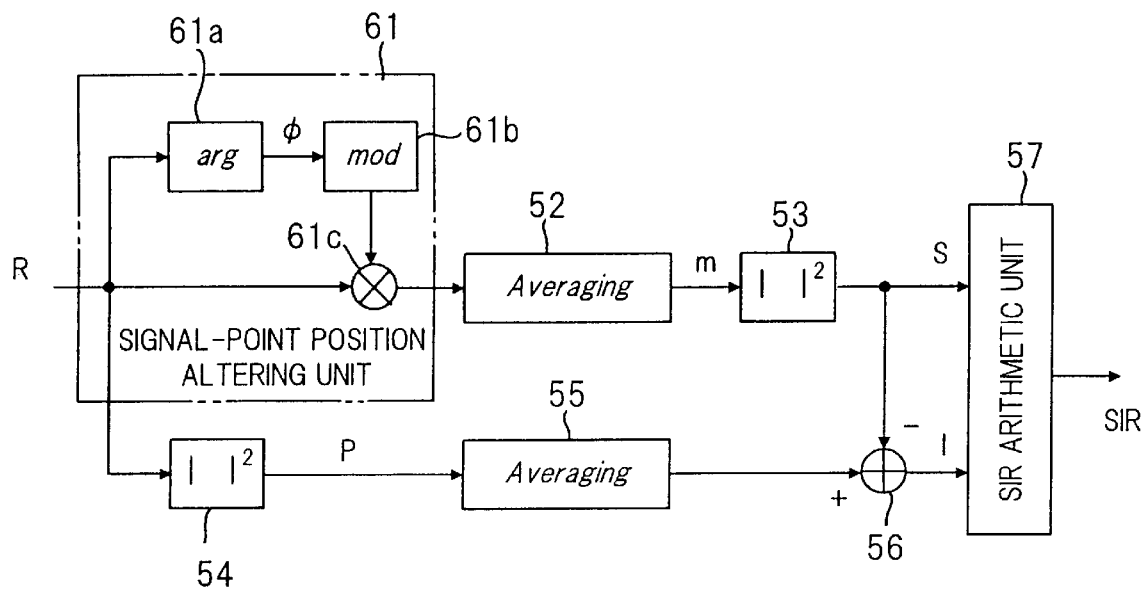
FIG. 9 is a block diagram showing the construction of an SIR measurement apparatus according to a second embodiment of the present invention.

FIG. 9 is a block diagram illustrating a second embodiment of a SIR measurement apparatus according to the present invention. Elements identical with those of the first embodiment shown in FIG. 7 are designated by like reference characters. The second embodiment differs from the first embodiment in the construction of the signal-point position altering unit.

Figure 10:
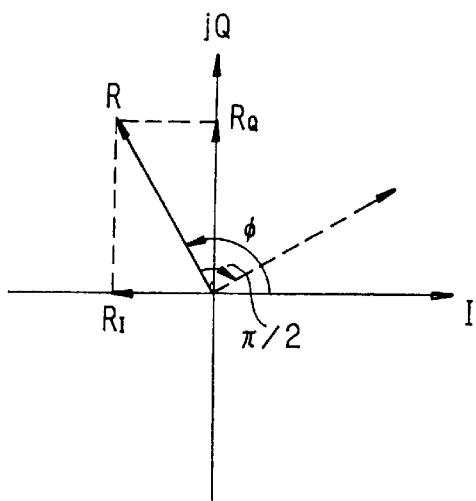
FIG. 10 is a diagram useful in describing a method of quadrant conversion according to the second embodiment.

In the first embodiment, the signal-point position altering unit takes the absolute values of the I component (in-phase component) and Q component (quadrature component) of the position vector R of the received signal point to convert the position vector to a signal in the first quadrant of the I-jQ complex plane. In the second embodiment, the quadrant of the I-jQ complex plane in which the position vector R of the received signal point belongs is determined and the position vector R is subjected to phase rotation through an angle conforming to the quadrant in which the vector R belongs, thereby effecting a conversion to the first quadrant of the I-jQ complex plane. More specifically, as shown in FIG. 10, the apparatus obtains the angle φ of the position vector R, obtains the k which satisfies the equation $$(\pi/2) \cdot k \leq \phi < (\pi/2) \cdot (k+1) \tag{5}$$

where k is an integer, and rotates the position vector in the clockwise direction by k ($\pi/2$) to convert the position vector to a position vector in the first quadrant. It should be noted that the φ which satisfies Equation (5) is expressed by $$k = \phi \bmod(\pi/2) \tag{6}$$

With regard to the integer k, k=0 holds in a case where the position vector R resides in the first quadrant, k=1 in a case where the position vector R resides in the second quadrant, k=2 in a case where the position vector R resides in the third quadrant, and k=0 in a case where the position vector R resides in the fourth quadrant, and the position vector R is rotated clockwise by 0, $\pi/2$, $\pi$ and $3\pi/2$, respectively, to convert the position vector to a position vector in the first quadrant.

As shown in FIG. 9, the SIR measurement apparatus includes a signal-point position altering unit 61. The latter has an angle calculator 61a for obtaining the angle φ of the position vector R, an arithmetic unit 61b for calculating k in accordance with Equation (6), and a rotation arithmetic unit 61c for rotating the position vector R clockwise by k·($\pi/2$). The SIR apparatus further includes the averaging arithmetic unit 52 for calculating the average value m of position vectors of N symbols converted to vectors in the first quadrant in the signal-point position altering unit 61, the desired signal power arithmetic unit 53 for calculating $m^2$ (desired signal power S) by squaring the I and Q components of the average value m and summing the squares, the received power calculating unit 54 for calculating received power P by squaring the I component RI and Q component RQ of the position vector of the received signal point and summing the squares, the averaging arithmetic unit 55 for calculating the average value of received power P, the subtractor 56 for subtracting $m^2$ (desired signal power S) from the average value of received power P in accordance with Equation (4) and outputting interference signal power I, and the SIR arithmetic unit 57 for calculating the SIR from the desired signal power S and interference signal power I in accordance with Equation (1).

In accordance with the second embodiment, N symbols undergo a subtraction operation only once, as in the first embodiment, and it is unnecessary to execute pilot detection, calculation of vector error and squaring of the vector error on a per-symbol basis and averaging is not required. This makes it possible to simplify the circuit arrangement and to simplify the arithmetic operations.

(D) Examination of SIR Measurement Precision According to the Invention

Figure 11:
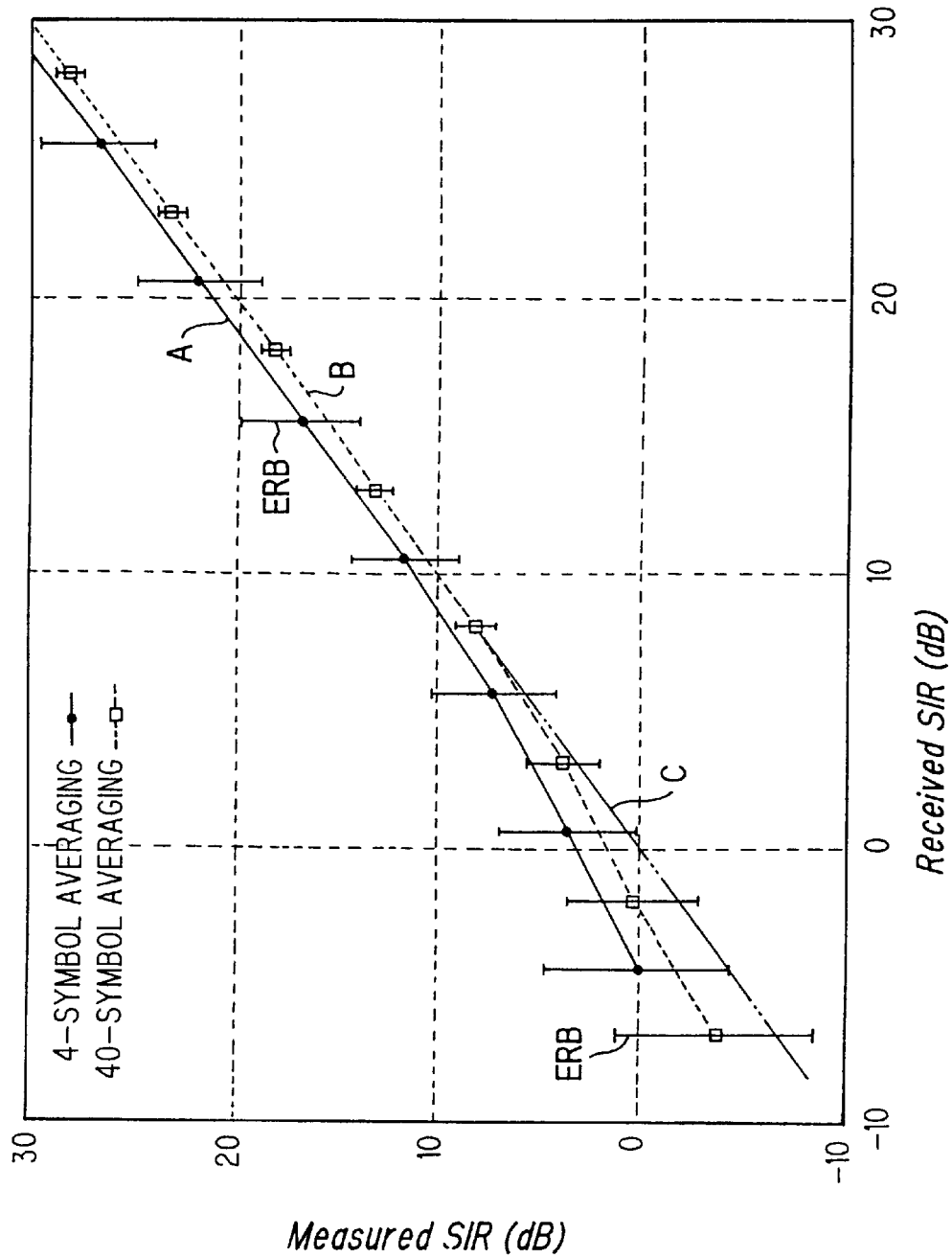
FIG. 11 is a characteristic diagram showing an SIR measurement precision characteristic in a static environment.

FIG. 11 is a characteristic diagram showing an SIR measurement precision characteristic in a static environment (an environment in which only thermal noise is present) according to the invention. Here the received SIR value is plotted along the horizontal axis C. and the measured SIR value is plotted along the vertical axis. Ideally the received SIR value is equal to the measured SIR value. An error bar ERB is the standard deviation (dB) from the measured average value; the shorter the error bar, the smaller the measurement variation. In FIG. 11, A indicates the characteristic in a case where the number of measured symbols is four, B indicates the characteristic in a case where the number of measured symbols is 40, and C is the ideal characteristic. It will be understood from this characteristic diagram that (1) the larger the number of symbols (the longer the averaging time), the higher the accuracy with which SIR can be measured, and (2) the smaller the received SIR, i.e. the larger the interference signal power I, the larger the measurement error.

Figure 12:
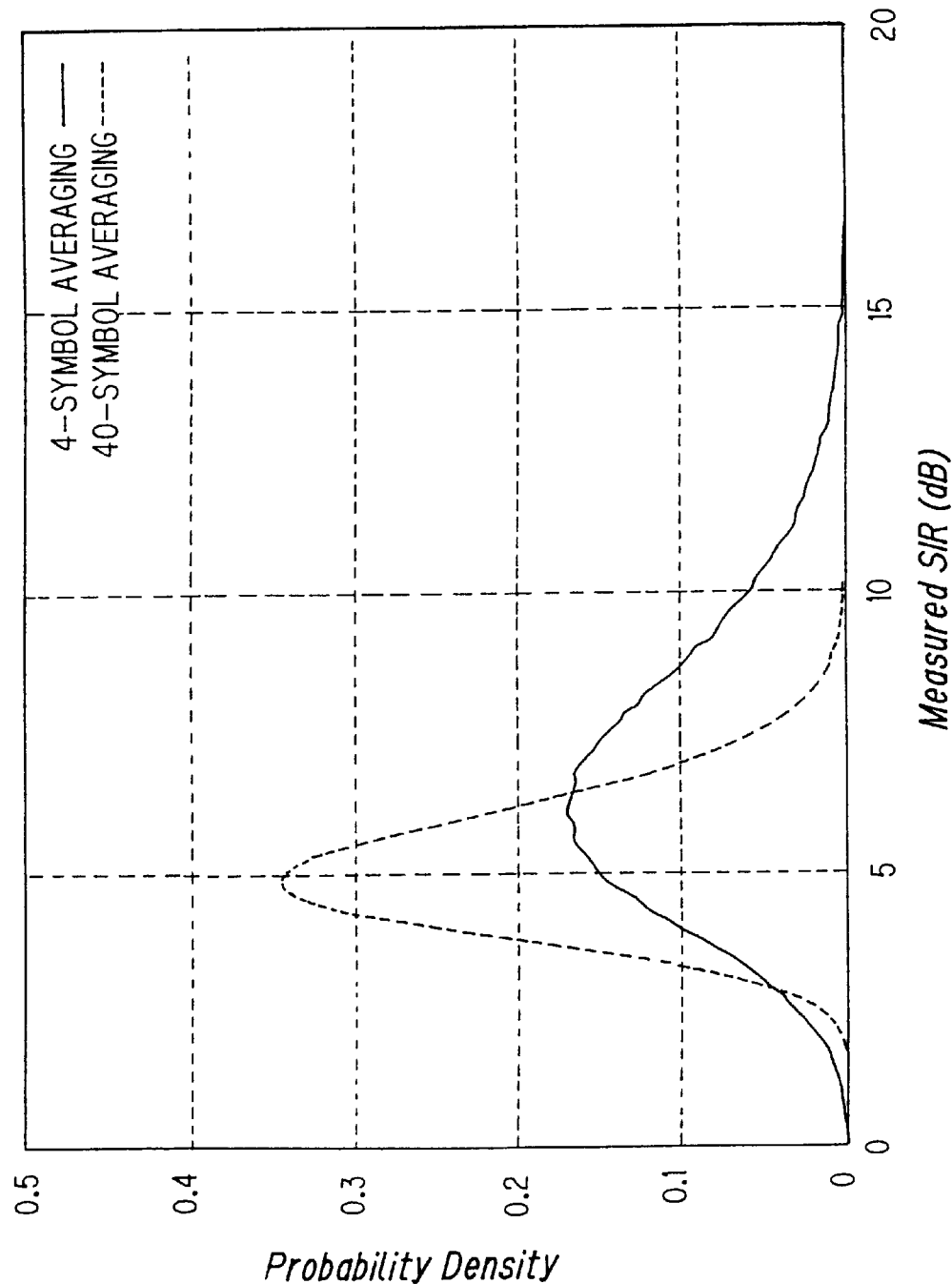
FIG. 12 is a diagram useful in describing a probability density distribution function of measured SIR in a static environment.

FIG. 12 is a diagram illustrating a probability density distribution function of measured SIR value in a static environment. It will be understood from the probability density distribution that measurement precision is raised by increasing the number of measured symbols.

(E) First Modification of the Invention

As mentioned above, FIGS. 11 and 12 demonstrate that the larger the number of symbols used in the averaging of power (the longer the averaging time), the higher the accuracy with which SIR can be measured, and that the smaller the received SIR, i.e. the larger the interference signal power I, the larger the measurement error.

In order to perform high-speed control of transmission power, it is required that the averaging time in SIR measurement be shortened. Accordingly, averaging time is shortened (the number of symbols used in SIR measurement is reduced), SIR is measured in a shorter period of time, the interference signal power I is monitored and averaging time is lengthened (the number of symbols used in SIR measurement is increased) as the interference signal power increases, whereby measurement precision is maintained.

Figure 13:
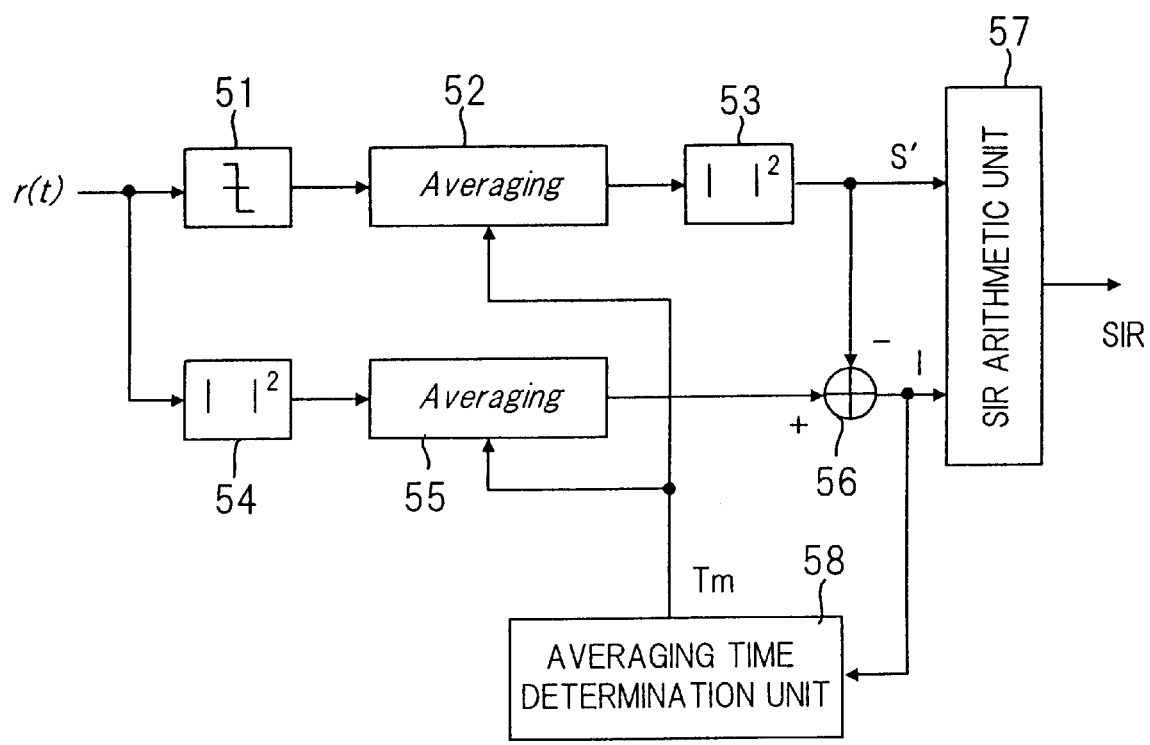
FIG. 13 is a modification of the first embodiment in which variation of averaging time of SIR measurement is controlled based upon interference signal power I.

FIG. 13 is a modification of the first embodiment (FIG. 7). This modification takes the foregoing considerations into account. Elements identical with those of the first embodiment shown are designated by like reference characters. This modification differs from the first embodiment in the provision of an averaging time determination unit 58 for monitoring the interference power I and varying, on the basis of the magnitude of interference power I, the symbol count N (averaging time Tm) used in SIR measurement. The averaging time determination unit 58 monitors the interference power I and maintains the accuracy of SIR measurement by lengthening the averaging time (increasing the number of symbols used in SIR measurement) in the averaging arithmetic units 52, 55 as the interference power increases.

Figure 14:
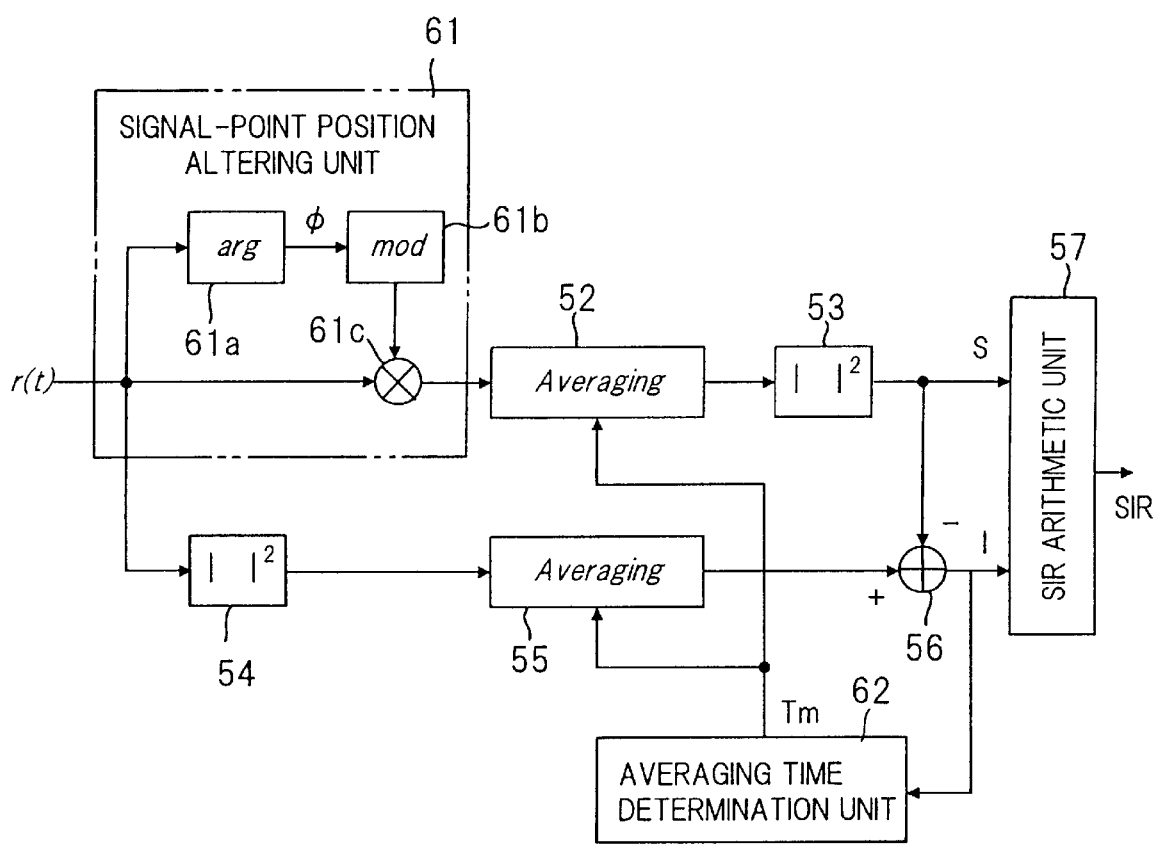
FIG. 14 is a modification of the second embodiment in which variation of averaging time of SIR measurement is controlled based upon interference signal power I.

FIG. 14 illustrates a modification of the second embodiment (FIG. 9). Elements identical with those of the second embodiment shown are designated by like reference characters. This modification differs from the second embodiment in the provision of an averaging time determination unit 62 for monitoring the interference power I and varying, on the basis of the magnitude of interference power I, the symbol count N (averaging time Tm) used in SIR measurement. The averaging time determination unit 62 monitors the interference power I and maintains the accuracy of SIR measurement by lengthening the averaging time (increasing the number of symbols used in SIR measurement) in the averaging arithmetic units 52, 55 as the interference power increases.

(F) Second Modification of the Invention

The smaller the received SIR, i.e. the larger the interference power I, the larger the measurement error of the SIR becomes, irrespective of the number of symbols, as evident from FIG. 11. Accordingly, SIR/(SIR+1) is calculated to obtain a correction coefficient c, and SIR is multiplied by the correction coefficient c to obtain the true SIR, thereby making possible highly precise measurement. If SIR>>1 holds, then we have c≅1 and SIR is not corrected. However, when SIR becomes small and the interference power I increases, SIR is corrected to improve accuracy.

Figure 15:
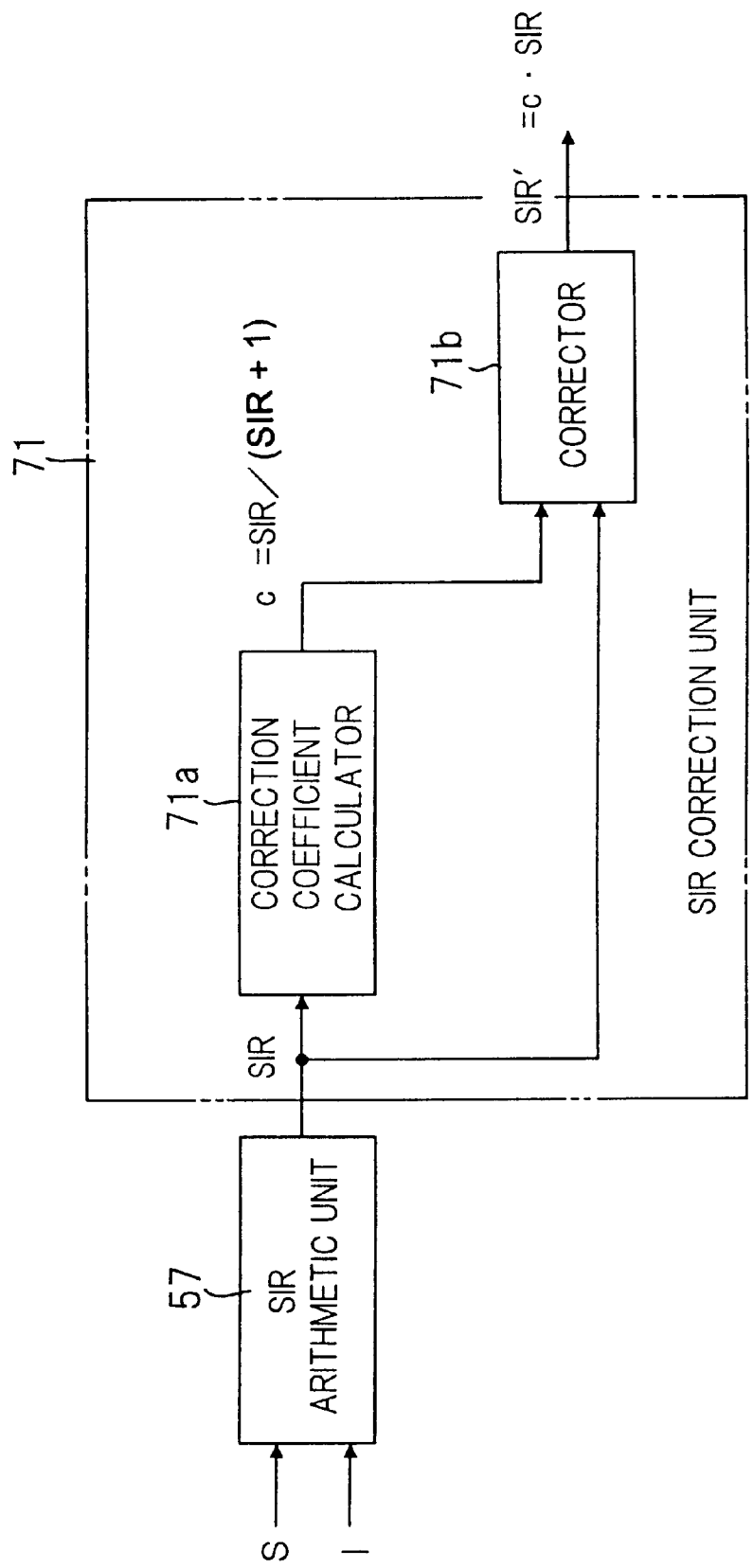
FIG. 15 is a block diagram showing the construction of an SIR correction unit.
Figure 16:
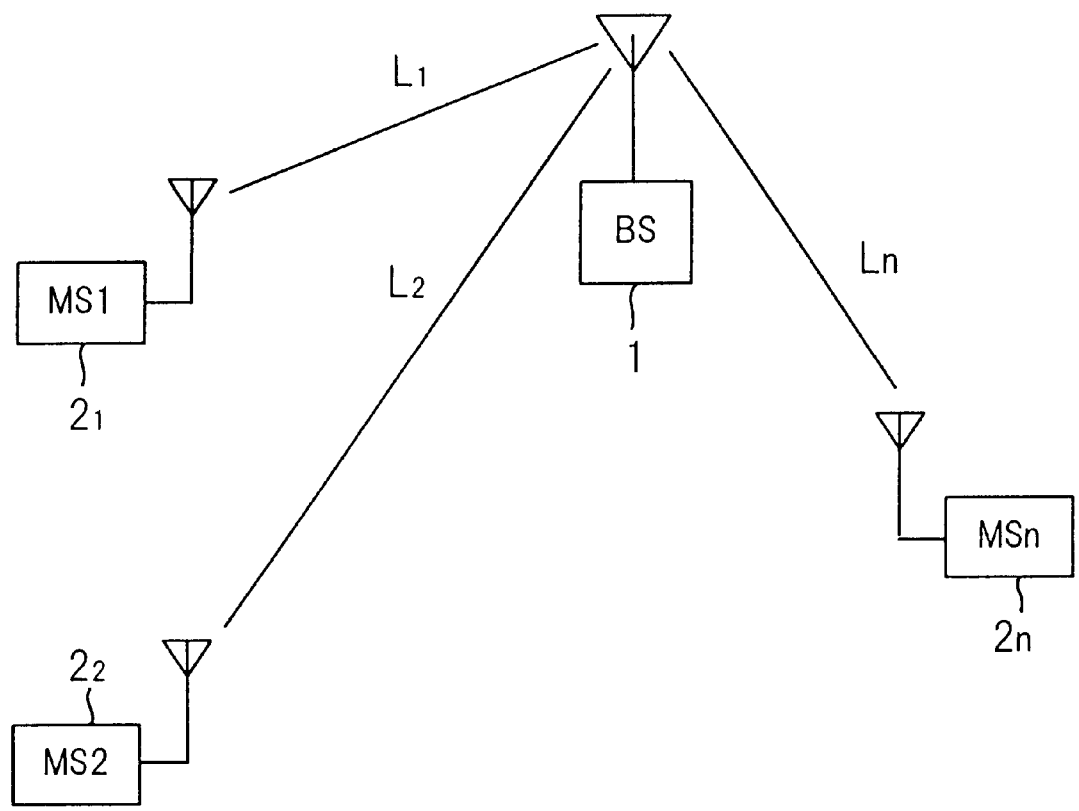
FIG. 16 is an explanatory view illustrating the need for transmission power control in the prior art.
Figure 17:
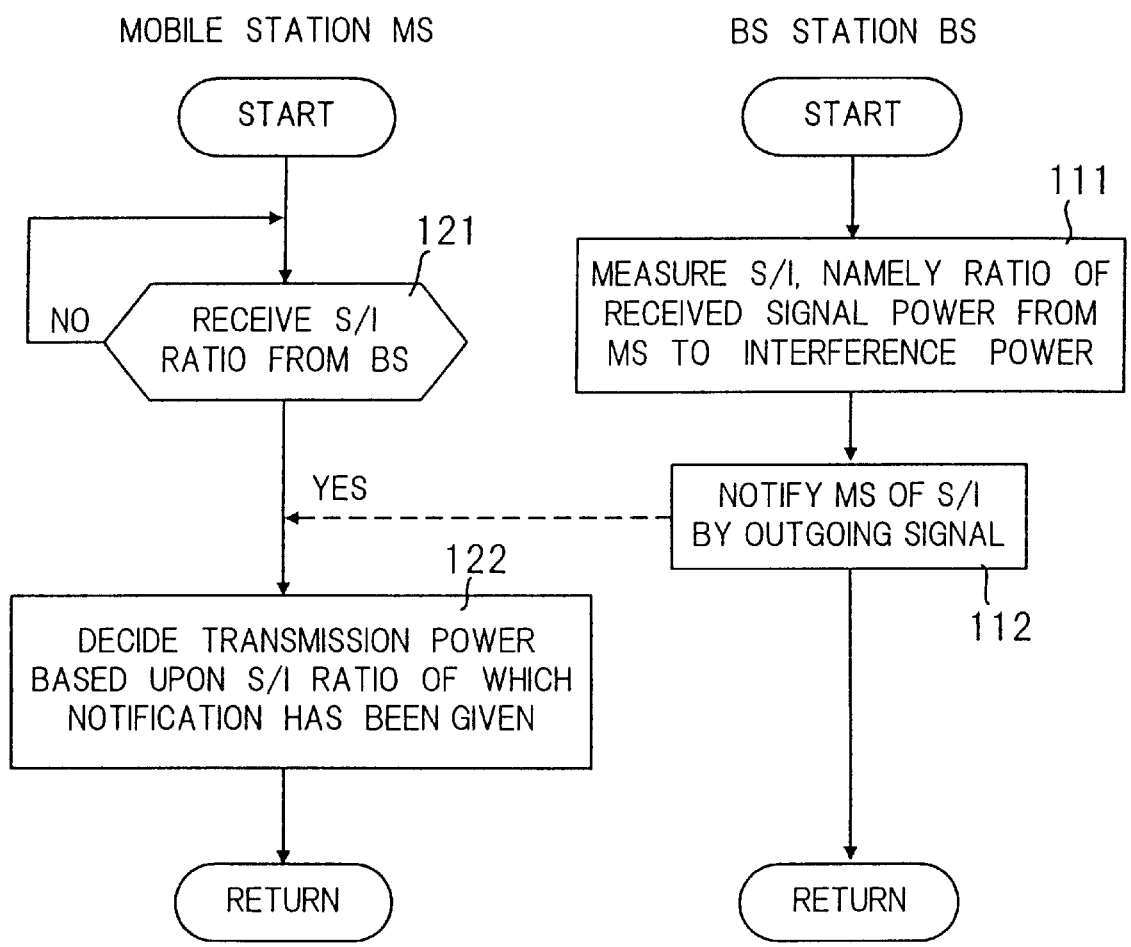
FIG. 17 is a flowchart showing the flow of processing in a closed-loop system according to the prior art.
Figure 18:
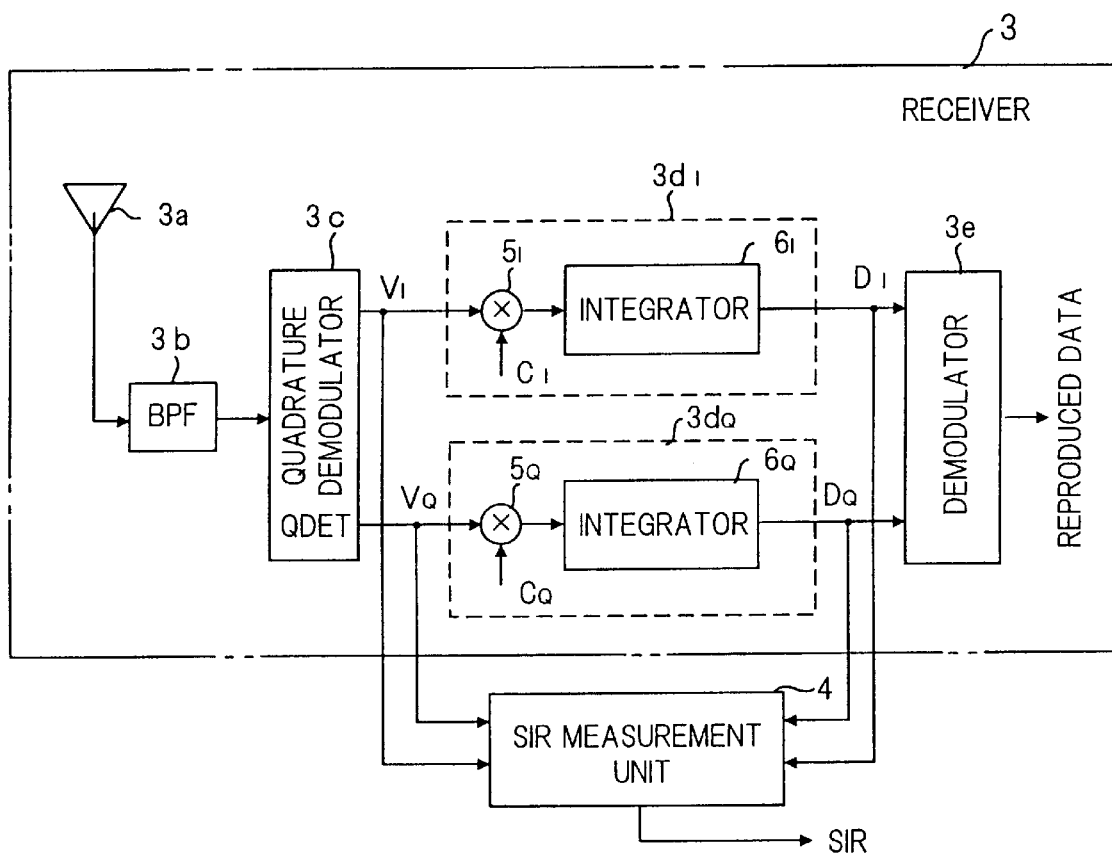
FIG. 18 is a block diagram useful in describing the position at which an SIR measurement apparatus is disposed in the prior art.
Figure 19:
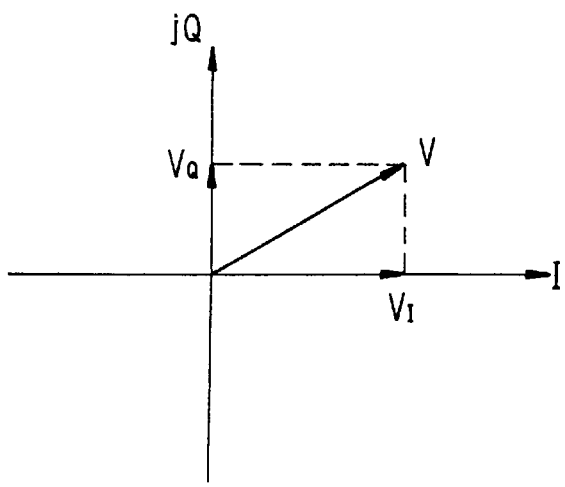
FIG. 19 is a vector diagram for describing vector representation of a spread-spectrum modulated signal.
Figure 20:
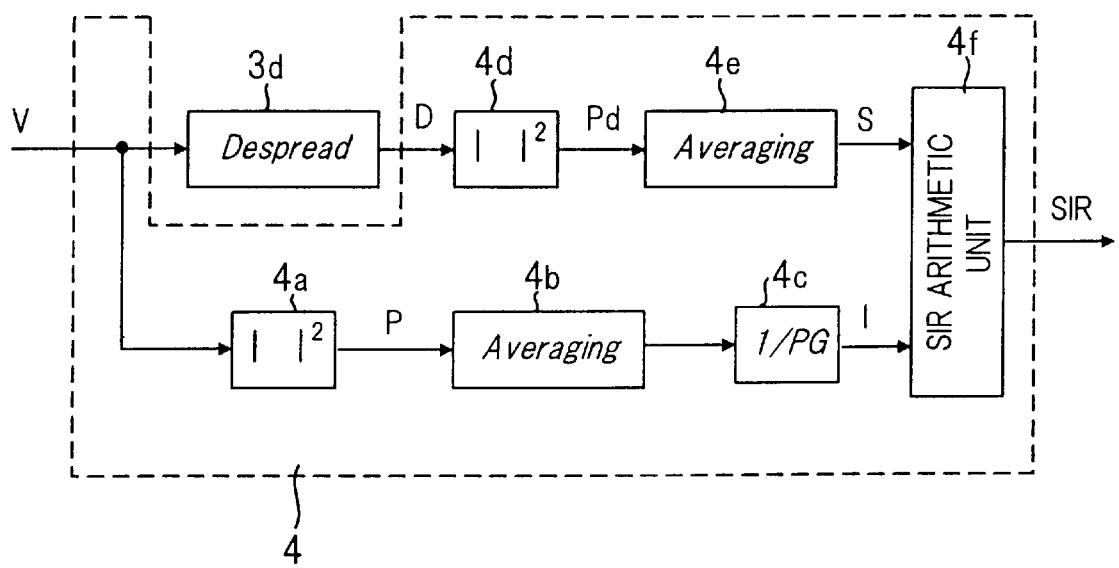
FIG. 20 is a block diagram showing the construction of an SIR measurement apparatus according to the prior art.
Figure 21:
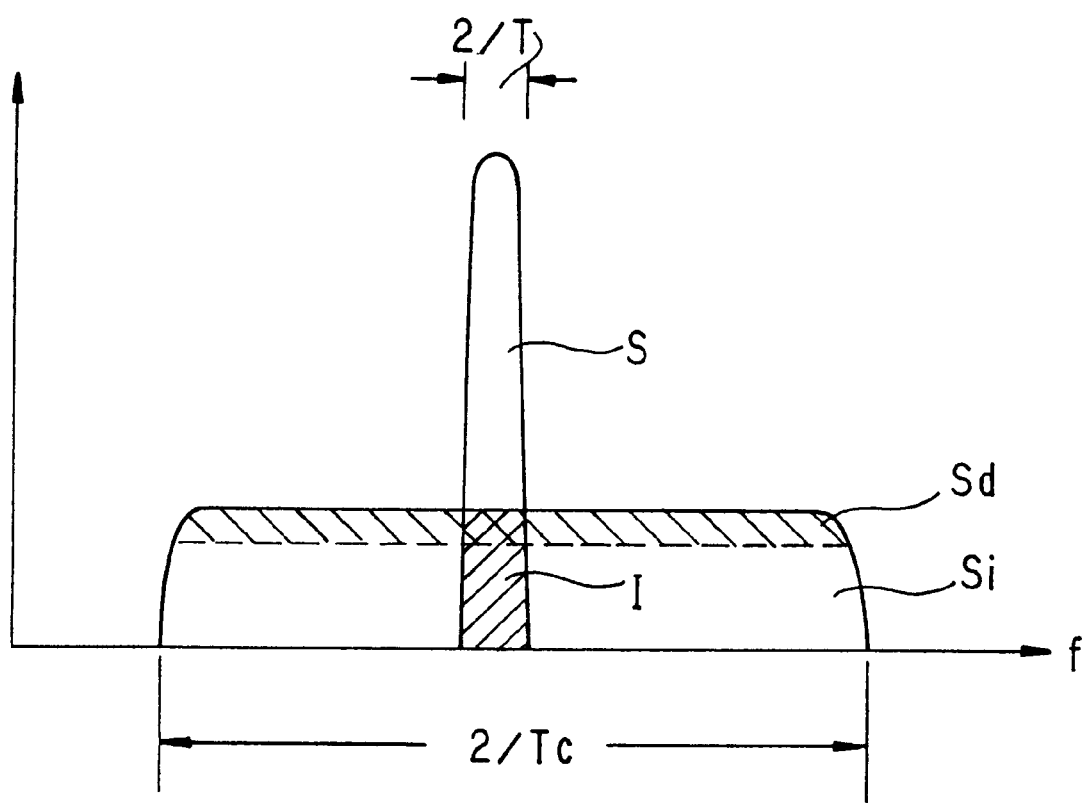
FIG. 21 is a diagram showing SIR measurement according to the prior art.

FIG. 15 is a block diagram showing the construction Ci of the SIR correction unit, which takes the foregoing into account. The SIR arithmetic unit 57 is that of the first modification of the first and second embodiments. The output of the SIR arithmetic unit 57 is applied to a SIR correction unit 71, which includes a correction coefficient calculator 71a for calculating the SIR correction coefficient c in accordance with the following equation:

$$c = SIR/(SIR+1) \qquad (7)$$

and a corrector 71b for outputting the true SIR' upon correcting SIR in accordance with the following equation:

$$SIR' = C \cdot SIR \qquad (8)$$

If this arrangement is adopted, the correct SIR value can be measured and output irrespective of the number of symbols.

The present invention has been described above primarily with regard to a case where the S/I ratio, namely the ratio of desired power to interference power, is measured as SIR. However, the invention is applicable also to a case where the S/N ratio, namely the ratio of desired power to noise power, is measured as SIR.

Further, the invention has been described with regard to SIR measurement in wireless communication using spread-spectrum modulation. However, the invention is applicable also to wireless communication that does not rely upon spread-spectrum modulation.

Figure 22:
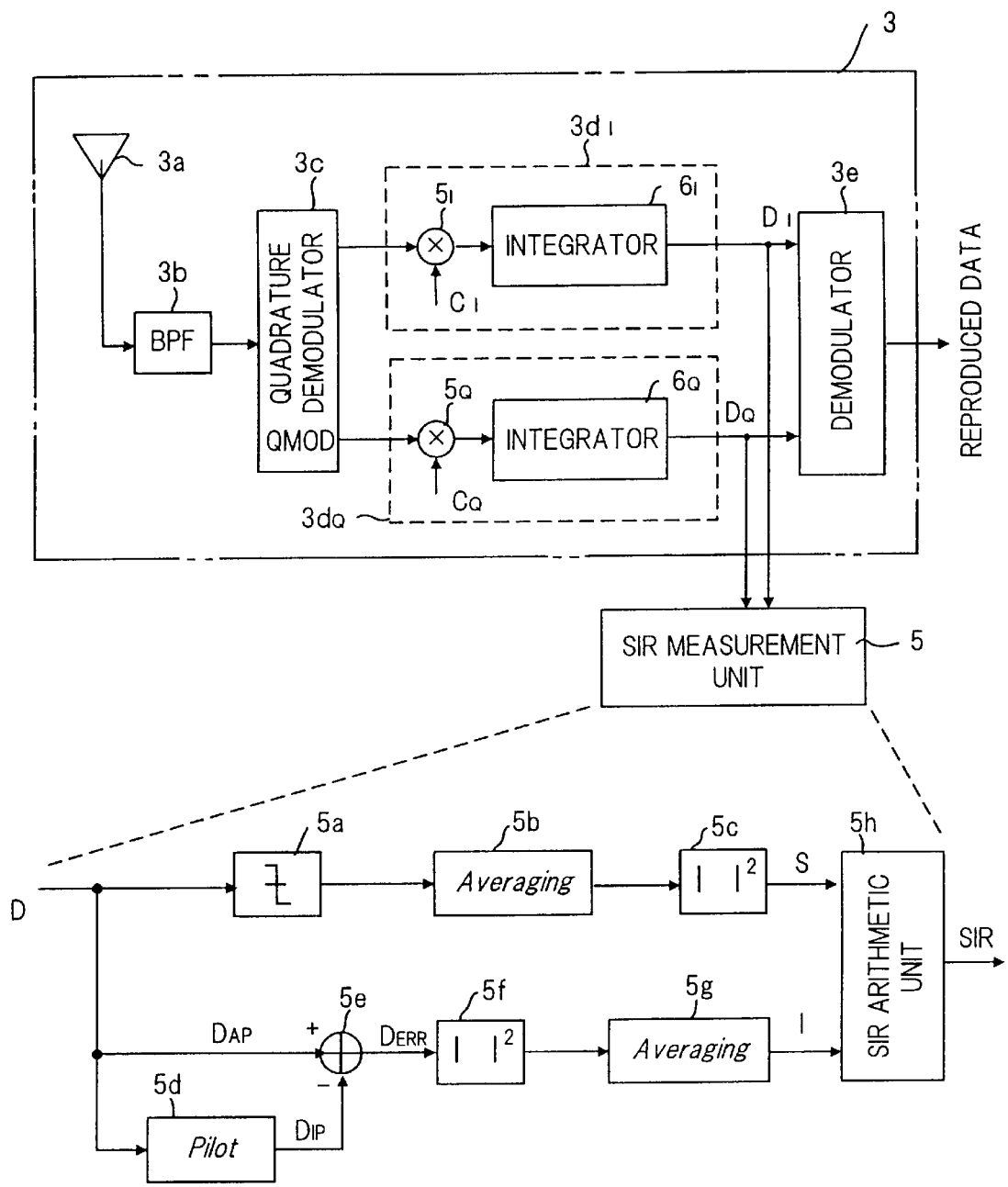
FIG. 22 is a block diagram showing the construction of an SIR measurement apparatus according to the prior art.
Figure 23A:
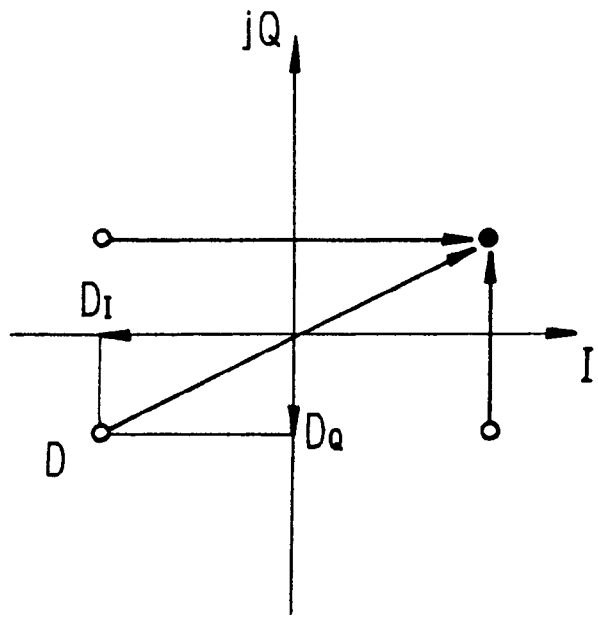
FIGS. 23A, 23B are diagrams for describing SIR measurement according to the prior art.
Figure 23B:
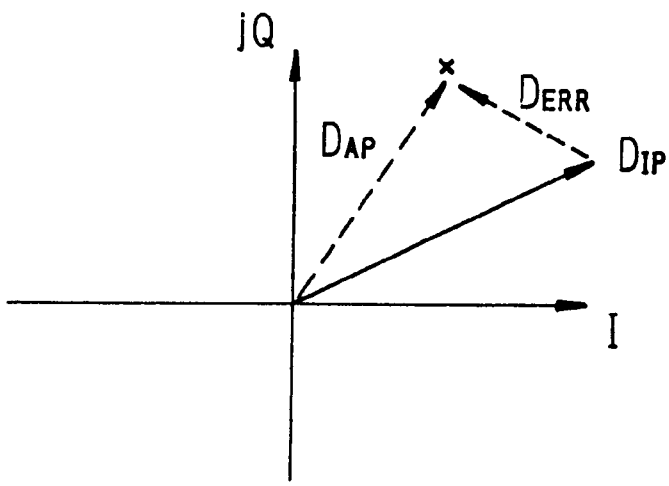

In accordance with the present invention, a SIR measurement apparatus is adapted to take absolute values of an I component (in-phase component) and Q component (quadrature component) of a received signal to convert the received signal to a signal in the first quadrant of an I-Q orthogonal coordinate system and square the average value of the converted signal to obtain first average power, calculate the average value of the square of the received signal to obtain second average power, subtract the first average power from the second average power to obtain noise power or interference signal power, and adopt the first average power as desired signal power, calculate the S/N ratio or S/I ratio from the desired signal power and noise power or interference signal power, and output the ratio calculated. As a result, unlike the prior art (FIG. 22), it is unnecessary to execute pilot detection, calculation of vector error and squaring of the vector error on a per-symbol basis and averaging is not required. This makes it possible to simplify the circuit arrangement and to simplify the arithmetic operations. Moreover, measurement precision equivalent to that of the prior-art method can be achieved.

Further, in accordance with the present invention, a SIR measurement apparatus is adapted to determine a quadrant of an I-Q orthogonal coordinate system in which a received signal comprising an I component (in-phase component) and Q component (quadrature component) belongs, convert the received signal to a signal in the first quadrant of the I-Q orthogonal coordinate system by subjecting the received signal to phase rotation through an angle conforming to the quadrant in which the received signal belongs, square the average value of the converted signal to obtain first average power, calculate the average value of the square of the received signal to obtain second average power, subtract the first average power from the second average power to obtain noise power or interference signal power, and adopt the first average power as desired signal power, calculate S/N ratio or S/I ratio from the desired signal power and noise power or interference signal power and output the ratio calculated. As a result, unlike the prior art (FIG. 22), it is unnecessary to execute pilot detection, calculation of vector error and squaring of the vector error on a per-symbol basis and averaging is not required. This makes it possible to simplify the circuit arrangement and to simplify the arithmetic operations. Moreover, measurement precision equivalent to that of the prior-art method can be achieved.

Further, in accordance with the present invention, it is so arranged that the number of symbols (averaging time) used in calculating the average value of received power and the average value of desired power is controlled, in order to vary the same, in dependence upon noise power or interference power. As a result, it is possible to improve SIR measurement accuracy in a state in which the SIR value is small, and to shorten SIR measurement time in a state in which the SIR value is large.

Further, in accordance with the present invention, it is so arranged that SIR/(SIR+1) is calculated to obtain a correction coefficient, and SIR is multiplied by the correction coefficient c to obtain and output the true SIR. As a result, it is possible to improve SIR measurement accuracy in a state in which the SIR value is small.

As many apparently widely different embodiments of the present invention can be made without departing from the spirit and scope thereof, it is to be understood that the invention is not limited to the specific embodiments thereof except as defined in the appended claims.

What is claimed is:

1. A SIR apparatus for measuring S/N ratio, which is the ratio of a desired signal power to noise power, or S/I ratio, which is the ratio of desired signal power to interference signal power, comprising:

means for converting a received signal, which includes an I component (in-phase component) and a Q component (quadrature component), to a signal in the first quadrant of an I-Q orthogonal coordinate system, and squaring the average value of the converted signal to obtain first average power;

means for calculating the average value of the square of the received signal to obtain second average power;

means for subtracting the first average power from the second average power to obtain noise power or interference signal power;

means for adopting the first average power as desired signal power, calculating S/N ratio or S/I ratio from the desired signal power and noise power or interference signal power, and outputting the ratio calculated; and means for varying averaging time, which is for calculating the first and second average powers, in dependence upon the noise power or interference signal power.

2. A SIR apparatus for measuring S/N ratio, which is the ratio of a desired signal power to noise power, or S/I ratio, which is the ratio of desired signal power to interference signal power, comprising:

means for converting a received signal, which includes an I component (in-phase component) and a Q component (quadrature component), to a signal in the first quadrant of an I-Q orthogonal coordinate system, and squaring the average value of the converted signal to obtain first average power;

means for calculating the average value of the square of the received signal to obtain second average power;

means for subtracting the first average power from the second average power to obtain noise power or interference signal power;

means for adopting the first average power as desired signal power, calculating S/N ratio or S/I ratio from the desired signal power and noise power or interference signal power, and outputting the ratio calculated; and means for obtaining a correction coefficient by calculating SIR/(SIR+1), multiplying SIR by this correction coefficient and outputting the product as true SIR, where the S/N ratio or S/I ratio is expressed as SIR.

3. A SIR apparatus for measuring S/N ratio, which is the ratio of a desired signal power to noise power, or S/I ratio, which is the ratio of desired signal power to interference signal power, comprising:

means for determining a quadrant of an I-Q orthogonal coordinate system in which a received signal comprising an I component (in-phase component) and Q component (quadrature component) belongs;

means for converting the received signal to a signal in the first quadrant of the I-Q orthogonal coordinate system by subjecting the received signal to phase rotation through an angle conforming to the quadrant in which the received signal belongs, and squaring the average value of the converted signal to obtain first average power;

means for calculating the average value of the square of the received signal to obtain second average power;

means for subtracting the first average power from the second average power to obtain noise power or interference signal power;

means for adopting the first average power as desired signal power, calculating S/N ratio or S/I ratio from the desired signal power and noise power or interference signal power, and outputting the ratio calculated; and means for varying averaging time, which is for calculating the first and second average powers, in dependence upon the noise power or interference signal power.

4. A SIR apparatus for measuring S/N ratio, which is the ratio of a desired signal power to noise power, or S/I ratio, which is the ratio of desired signal power to interference signal power, comprising:

means for determining a quadrant of an I-Q orthogonal coordinate system in which a received signal comprising an I component (in -phase component) and Q component (quadrature component) belongs;

means for converting a received signal to a signal in the first quadrant of the I-Q orthogonal coordinate system by subjecting the received signal to phase rotation through an angle conforming to the quadrant in which the received signal belongs, and squaring the average value of the converted signal to obtain first average power;

means for calculating the average value of the square of the received signal to obtain second average power;

means for subtracting the first average power from the second average power to obtain noise power or interference signal power;

means for adopting the first average power as desired signal power, calculating S/N ratio or S/I ratio from the desired signal power and noise power or interference signal power, and outputting the ratio calculated; and means for obtaining a correction coefficient by calculating SIR/(SIR+1), multiplying SIR by this correction coefficient and outputting the product as true SIR, where the S/N ratio or S/I ratio is expressed as SIR.

\* \* \* \* \*